US012236844B2

(12) United States Patent
Li

(10) Patent No.: US 12,236,844 B2
(45) Date of Patent: Feb. 25, 2025

(54) PIXEL CIRCUIT, PIXEL DRIVING METHOD AND DISPLAY DEVICE

(71) Applicant: TCL CHINA STAR OPTOELECTRONICS TECHNOLOGY CO., LTD., Guangdong (CN)

(72) Inventor: Jialong Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,045

(22) PCT Filed: Mar. 22, 2022

(86) PCT No.: PCT/CN2022/082246
§ 371 (c)(1),
(2) Date: May 14, 2022

(87) PCT Pub. No.: WO2023/173453
PCT Pub. Date: Sep. 21, 2023

(65) Prior Publication Data
US 2024/0153438 A1 May 9, 2024

(30) Foreign Application Priority Data
Mar. 15, 2022 (CN) ......................... 202210251508.3

(51) Int. Cl.
*G09G 3/32* (2016.01)

(52) U.S. Cl.
CPC ....... *G09G 3/32* (2013.01); *G09G 2300/0439* (2013.01); *G09G 2310/027* (2013.01)

(58) Field of Classification Search
CPC .. G09G 3/2022; G09G 3/2007; G09G 3/3233; G09G 2310/08; G09G 2300/0861;
(Continued)

(56) References Cited

U.S. PATENT DOCUMENTS 9,632,374 B2 * 4/2017 Murakami ........ G02F 1/136204
11,763,743 B2 * 9/2023 Chen .................... G09G 3/2007 345/691
(Continued)

FOREIGN PATENT DOCUMENTS

CN 105895022 A 8/2016
CN 110021265 A 7/2019
(Continued)

OTHER PUBLICATIONS

International Search Report in International application No. PCT/CN2022/082246, mailed on Aug. 30, 2022.
(Continued)

*Primary Examiner* — Olga V Merkoulova
(74) *Attorney, Agent, or Firm* — PV IP PC; Wei Te Chung

(57) ABSTRACT

The disclosure provides a pixel circuit, a pixel driving method, and a display device. The pixel circuit includes a driving module and a light emitting module. The light emitting module includes a first light emitting unit, a first light emitting element, a second light emitting unit, and a second light emitting element.

18 Claims, 4 Drawing Sheets

(58) Field of Classification Search
CPC ... G09G 2300/0895; G09G 2300/0804; G09G 2300/0426; G09G 2300/0842; G09G 2300/0242; G09G 2300/0247; G09G 2300/0819
See application file for complete search history.

(56) References Cited

U.S. PATENT DOCUMENTS

| | | | | |
|---|---|---|---|---|
| 2006/0103608 | A1* | 5/2006 | Kwak | G09G 3/3233 345/76 |
| 2014/0146426 | A1* | 5/2014 | Murakami | G02F 1/136204 361/56 |
| 2016/0240127 | A1 | 8/2016 | Duan | |
| 2017/0039934 | A1* | 2/2017 | Ma | G09G 3/3233 |
| 2020/0243003 | A1* | 7/2020 | Yang | G09G 3/3233 |
| 2021/0295774 | A1* | 9/2021 | Sun | G09G 3/3233 |
| 2022/0310011 | A1* | 9/2022 | Chen | G09G 3/2022 |

FOREIGN PATENT DOCUMENTS

| | | | |
|---|---|---|---|
| CN | 111243514 | A | 6/2020 |
| CN | 111312158 | A | 6/2020 |
| CN | 111477166 | A | 7/2020 |
| CN | 113487997 | A | 10/2021 |
| CN | 113808547 | A | 12/2021 |
| JP | 2003330421 | A | 11/2003 |
| KR | 20150093909 | A | 8/2015 |
| KR | 20180049290 | A | 5/2018 |

OTHER PUBLICATIONS

Written Opinion of the International Searching Authority in International application No. PCT/CN2022/082246, mailed on Aug. 30, 2022.

Chinese Office Action in corresponding Chinese Patent Application No. 202210251508.3 dated Nov. 25, 2022, pp. 1-6.

* cited by examiner

PIXEL CIRCUIT, PIXEL DRIVING METHOD AND DISPLAY DEVICE

TECHNICAL FIELD

The present disclosure relates to a display field, and in particular, to a pixel circuit, a pixel driving method, and a display device.

BACKGROUND

Micro-LED/Mini-LED will be widely used in the future display field because of their high brightness and high reliability. The luminous efficiency, brightness, and color coordinates of Micro-LED/Mini-LED as a self-luminous device vary with current density at low current density. Therefore, it is necessary for the Micro-LED/Mini-LED to realize the grayscale display at a high current density, that is, the grayscale display is realized at a high current. The general current control driving circuit cannot be driven independently with a high or low grayscale, and cannot satisfy both a long-period light emitting driving at a high grayscale and a high-current driving at a low gray scale.

Technical Problems

The present disclosure provides a pixel circuit, a pixel driving method, and a display device, which can solve the problem that the current control driving circuit in the prior art cannot be driven independently at the high or low grayscale, and cannot satisfy the long-period light emitting driving at the high grayscale and the high-current driving at the low grayscale at the same time.

Technical Solutions

According to a first aspect, the present disclosure provides a pixel circuit including a driving module and a light emitting module; wherein, the driving module is electrically connected to a first power supply line, a first node, and a second node, respectively, and the driving module is configured to control to conduct or disconnect the communication between the first power supply line and the second node under the control of a potential of the first node;

the light emitting module includes a first light emitting unit, a first light emitting element, a second light emitting unit, and a second light emitting element;

the first light emitting unit is electrically connected to a data wire, a scan wire, the first node, the second node, and the first light emitting element, respectively, and the first light emitting unit is configured to control the potential of the first node according to a potential of the data wire under the control of a potential of the scan wire to control, to conduct or disconnect the communication between the first power supply line and the first light emitting element;

wherein the second light emitting unit is electrically connected to the data wire, the scan wire, the second node, and the second light emitting element, respectively, and the second light emitting unit is configured to control to conduct or disconnect the communication between the second node and the second light emitting element in accordance with the potential of the data wire under the control of the potential of the scan wire.

In the pixel circuit provided in the present disclosure, the driving module includes a first transistor. A first terminal of the first transistor is electrically connected to the first node, a second terminal of the first transistor is electrically connected to the first power supply line, and a third terminal of the first transistor is electrically connected to the second node.

In the pixel circuit provided in the present disclosure, the first light emitting unit includes a second transistor, a third transistor, a fourth transistor, a first zener diode, and a first capacitor;

a first terminal of the second transistor is electrically connected to the scan wire, a first terminal of the second transistor is electrically connected to the data wire, and a third terminal of the second transistor is electrically connected to the first node;

a first terminal of the third transistor is electrically connected to the scan wire, a first terminal of the third transistor is electrically connected to the first node, and a third terminal of the third transistor is electrically connected to a third node;

a first terminal of the fourth transistor is electrically connected to a control wire, a second terminal of the fourth transistor is electrically connected to the second node, and a third terminal of the fourth transistor is electrically connected to an anode terminal of the first light emitting element; a cathode terminal of the first light emitting element is electrically connected to a second power supply line;

an anode terminal of the first zener diode is electrically connected to the first node, and a cathode terminal of the first zener diode is electrically connected to the third node; and a first end of the first capacitor is electrically connected to the third node, and a second terminal of the first capacitor is electrically connected to the second node.

In the pixel circuit provided in the present disclosure, the first light emitting unit further includes a fifth transistor. A first terminal of the fifth transistor is electrically connected to a reset control wire, a second terminal of the fifth transistor is electrically connected to a reset wire, and a third terminal of the fifth transistor is electrically connected to the third node.

In the pixel circuit provided in the present disclosure, the second light emitting unit includes a sixth transistor and a seventh transistor;

a first terminal of the sixth transistor is electrically connected to the scan wire, a second terminal of the sixth transistor is electrically connected to the data wire, and a third terminal of the sixth transistor is electrically connected to a fourth node;

a first terminal of the seventh transistor is electrically connected to the fourth node, a second terminal of the seventh transistor is electrically connected to the second node, and a third terminal of the seventh transistor is electrically connected to an anode terminal of the second light emitting element; and a cathode end of the second light emitting element is electrically connected to a second power supply line.

In the pixel circuit provided in the present disclosure, the second light emitting unit further includes an eighth transistor, a second zener diode, and a second capacitor;

a first terminal of the eighth transistor is electrically connected to the scan wire, a second terminal of the eighth transistor is electrically connected to the fourth node, and a third terminal of the eighth transistor is electrically connected to a fifth node;

an anode terminal of the second zener diode is electrically connected to the fourth node, and a cathode terminal of the second zener diode is electrically connected to the fifth node; and a first terminal of the second capacitor is electrically connected to the fifth node, and a second terminal of the second capacitor is electrically connected to the anode terminal of the second light emitting element; and a cathode terminal of the second light emitting element is electrically connected to the second power source.

In the pixel circuit provided in the present disclosure, the second light emitting unit further includes a ninth transistor. A first terminal of the ninth transistor is electrically connected to a reset control wire, a second terminal of the ninth transistor is electrically connected to a reset wire, and a third terminal of the ninth transistor is electrically connected to the fifth node.

In the pixel circuit provided in the present disclosure, the first light emitting element is a Micro-light emitting diode or a Mini-light emitting diode, and the second light emitting element is a Micro-light emitting diode or a Mini-light emitting diode.

According to a second aspect, the present disclosure further provides a pixel driving method applied to the pixel circuit described above. The pixel driving method includes:

controlling the driving module to connect or disconnect the communication between the first power supply line and the second node under the control of the potential of the first node;

controlling the first light emitting unit to connect or disconnect the communication between the first power supply line and the first light emitting element in accordance with the potential of the data wire under the control of the potential of the scan wire; and controlling the second light emitting unit to connect or disconnect the communication between the second node and the second light emitting unit in accordance with the potential of the data wire under the control of the potential of the scan wire.

In the pixel driving method provided in the present disclosure, the display cycle includes a first control stage and a second control stage provided in sequence;

the pixel driving method includes in a high grayscale display mode:

in the first control stage, the first light emitting unit stores the potential of the data wire under the control of the potential of the scan wire, outputs the potential of the data wire to the first node, and controls to conduct the connection between the first power supply line and the second node, thereby controlling to conduct the communication between the first power supply line and the first light emitting element;

in the second control phase, the potential of the first node is equal to the potential of the data wire stored in the first light emitting unit in the first control stage, the connection between the first power supply line and the second node is controlled to be conducted, and the communication between the first power supply line and the first light emitting element is controlled to be conducted; in the second control stage, the second light emitting unit controls to conduct the communication between the second node and the second light emitting element in accordance with the potential of the data wire under the control of the scan wire;

the pixel driving method further includes in a low grayscale display mode:

in the first control phase and the second control phase, the second node is disconnected from the first light emitting element under the control of the first light emitting unit;

in the first control stage, the first light emitting unit stores the potential of the data wire under the control of the potential of the scan wire, outputs the potential of the data wire to the first node, and controls to conduct the connection between the first power supply line and the second node; and in the second control phase, the potential of the first node is equal to the potential of the data wire stored in the first light emitting unit in the first control stage, and a connection between the first power supply line and the second node is controlled to be conducted; in the second control stage, the second light emitting unit controls to conduct the communication between the second node and the second light emitting element in accordance with the potential of the data wire under the control of the scan wire.

In the pixel driving method provided in the present disclosure, the display cycle further includes a third control stage provided after the second control stage;

in the second control phase, the second light emitting unit further stores the potential of the data wire under the control of the scan wire; and in the third control phase, the second light emitting unit controls to conduct the communication between the second node and the second light emitting element based on the potential stored in the second control stage.

In the pixel driving method provided in the present disclosure, a period during which the second light emitting element emits light in the low grayscale display mode is less than a period during which the first light emitting element emits light in the high grayscale display mode.

According to a third aspect, the present disclosure further provides a display device including a pixel circuit, wherein the pixel circuit includes a driving module and a light emitting module; wherein, the driving module is electrically connected to a first power supply line, a first node, and a second node, respectively, and the driving module is configured to control to conduct or disconnect the communication between the first power supply line and the second node under the control of a potential of the first node;

the light emitting module includes a first light emitting unit, a first light emitting element, a second light emitting unit, and a second light emitting element;

the first light emitting unit is electrically connected to a data wire, a scan wire, the first node, the second node, and the first light emitting element, respectively, and the first light emitting unit is configured to control the potential of the first node according to a potential of the data wire under the control of a potential of the scan wire to control, to conduct or disconnect the communication between the first power supply line and the first light emitting element;

wherein the second light emitting unit is electrically connected to the data wire, the scan wire, the second node, and the second light emitting element, respectively, and the second light emitting unit is configured to control to conduct or disconnect the communication between the second node and the second light emitting element in accordance with the potential of the data wire under the control of the potential of the scan wire.

In the display device provided by the present disclosure, the driving module includes a first transistor. A first terminal of the first transistor is electrically connected to the first node, a second terminal of the first transistor is electrically connected to the first power supply line, and a third terminal of the first transistor is electrically connected to the second node.

In the display device provided by the present disclosure, the first light emitting unit includes a second transistor, a third transistor, a fourth transistor, a first zener diode, and a first capacitor;

- a first terminal of the second transistor is electrically connected to the scan wire, a first terminal of the second transistor is electrically connected to the data wire, and a third terminal of the second transistor is electrically connected to the first node;
- a first terminal of the third transistor is electrically connected to the scan wire, a first terminal of the third transistor is electrically connected to the first node, and a third terminal of the third transistor is electrically connected to a third node;
- a first terminal of the fourth transistor is electrically connected to a control wire, a second terminal of the fourth transistor is electrically connected to the second node, and a third terminal of the fourth transistor is electrically connected to an anode terminal of the first light emitting element; and a cathode terminal of the first light emitting element is electrically connected to a second power supply line.

An anode terminal of the first zener diode is electrically connected to the first node, and a cathode terminal of the first zener diode is electrically connected to the third node;

- a first end of the first capacitor is electrically connected to the third node, and a second terminal of the first capacitor is electrically connected to the second node.

In the display device provided in the present disclosure, the first light emitting unit further includes a fifth transistor. A first terminal of the fifth transistor is electrically connected to a reset control wire, a second terminal of the fifth transistor is electrically connected to a reset wire, and a third terminal of the fifth transistor is electrically connected to the third node.

In the display device provided by the present disclosure, the second light emitting unit includes a sixth transistor and a seventh transistor;

- a first terminal of the sixth transistor is electrically connected to the scan wire, a second terminal of the sixth transistor is electrically connected to the data wire, and a third terminal of the sixth transistor is electrically connected to a fourth node;
- a first terminal of the seventh transistor is electrically connected to the fourth node, a second terminal of the seventh transistor is electrically connected to the second node, and a third terminal of the seventh transistor is electrically connected to an anode terminal of the second light emitting element; and
- a cathode terminal of the second light emitting element is electrically connected to a second power supply wire.

In the display device provided by the present disclosure, the second light emitting unit further includes an eighth transistor, a second zener diode, and a second capacitor;

- a first terminal of the eighth transistor is electrically connected to the scan wire, a second terminal of the eighth transistor is electrically connected to the fourth node, and a third terminal of the eighth transistor is electrically connected to a fifth node;
- an anode terminal of the second zener diode is electrically connected to the fourth node, and a cathode terminal of the second zener diode is electrically connected to the fifth node; and
- a first terminal of the second capacitor is electrically connected to the fifth node, and a second terminal of the second capacitor is electrically connected to the anode terminal of the second light emitting element; and a cathode terminal of the second light emitting element is electrically connected to the second power source.

In the display device provided in the present disclosure, the second light emitting unit further includes a ninth transistor. A first terminal of the ninth transistor is electrically connected to a reset control wire, a second terminal of the ninth transistor is electrically connected to a reset wire, and a third terminal of the ninth transistor is electrically connected to the fifth node.

In the display device provided by the present disclosure, the first light emitting element is a Micro-light emitting diode or a Mini-light emitting diode, and the second light emitting element is a Micro-light emitting diode or a Mini-light emitting diode.

BENEFICIAL EFFECTS

The pixel circuit, the pixel driving method, and the display device provided in the present disclosure can be driven independently under a high grayscale voltage or a low grayscale voltage by means of the current control and the period control, so as to satisfy both the long-period driving at the high grayscale and the high-current driving at the low grayscale.

BRIEF DESCRIPTION OF THE DRAWINGS

In order to more clearly explain technical solutions in embodiments of the present disclosure, the drawings required for describing the embodiments will be briefly described below. Apparently, the drawings in the following description are merely some embodiments of the present disclosure, and those skilled in the art may obtain other drawings from these drawings without creative efforts.

EMBODIMENT OF THE PRESENT DISCLOSURE

The technical solutions in embodiments of the present disclosure will be clearly and completely described below with reference to the accompanying drawings for the embodiments of the present disclosure. Apparently, the described embodiments are only a part of embodiments of the present disclosure, and not all of the embodiments. Based on the embodiments of the present disclosure, all other embodiments obtained by those skilled in the art without creative efforts fall within the scope of the present disclosure.

The transistors in all embodiments of the present disclosure may be triode transistors, thin film transistors or field effect transistors or other devices having the same characteristics. In embodiments of the present disclosure, in order to differentiate two terminals of the transistor except a first terminal (control terminal), one terminal is referred to as a second terminal, and the other terminal is referred to as a third terminal.

In actual operation, when the transistor is a triode transistor, the first terminal may be a base, the second terminal may be a collector, and the third terminal may be an emitter. Alternatively, the first terminal may be the base, the second terminal may be the emitter, and the third terminal may be the collector.

In actual operation, when the transistor is a thin film transistor or a field effect transistor, the first terminal may be a gate, the second terminal may be a drain, and the third terminal may be a source. Alternatively, the first terminal may be the gate, the second terminal may be the source, and the third terminal may be the drain.

Figure 1:
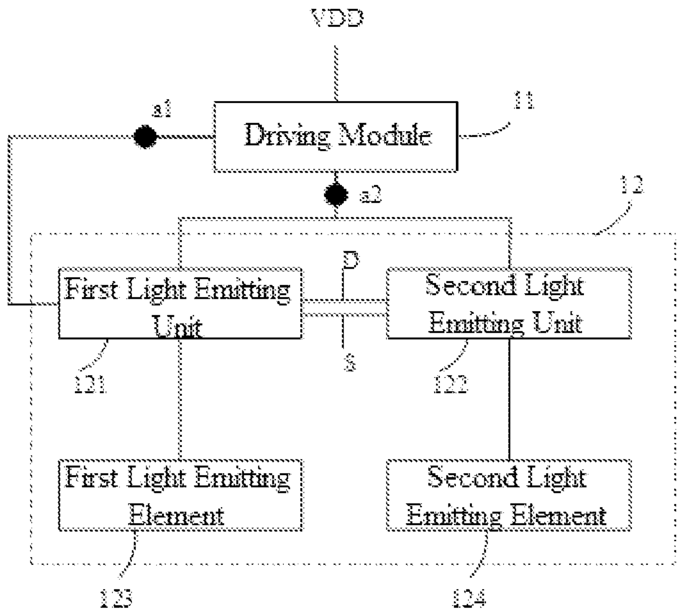
FIG. 1 is a structural schematic view of a pixel circuit according to an embodiment of the present disclosure.

Referring to FIG. 1, FIG. 1 is a schematic structural diagram of a pixel circuit according to an embodiment of the present disclosure. As shown in FIG. 1, a pixel circuit according to an embodiment of the present disclosure includes a driving module 11 and a light emitting module 12. The driving module 11 is electrically connected to a first power supply line VDD, a first node a1, and a second node a2, respectively. The light emitting module 12 includes a first light emitting unit 121, a first light emitting element 123, a second light emitting unit 122, and a second light emitting element 124. The first light emitting unit 121 is electrically connected to a data wire D, a scan wire S, the first node a1, the second node a2, and the first light emitting element 123. The second light emitting unit 122 is electrically connected to the data wire D, the scan wire S, the second node a2, and the second light emitting element 124.

The driving module 11 is configured to control to conduct or disconnect the communication between the first power supply line VDD and the second node a2 under the control of the potential of the first node a1. The first light emitting unit 121 is configured to control the potential of the first node a1 in accordance with the potential of the data wire D under the control of the potential of the scan wire S, so as to control to conduct or disconnect the communication between the first power supply line VDD and the first light emitting element 123. The second light emitting unit 122 is configured to control to conduct or disconnect the communication between the second node a2 and the second light emitting element 124 in accordance with the potential of the data wire D under the control of the potential of the scan wire S.

In the embodiment of the present disclosure, the first light emitting element 123 may be a Micro-LED or a Mini-LED. The second light emitting element 124 may be, but is not limited to, a Micro-LED or a Mini-LED.

Pixel circuits according to an embodiment of the present disclosure can be driven independently at the high or low grayscale by means of the current control and the period control. Both a long-period driving at a high grayscale and a high-current driving at a low grayscale are obtained. In addition, operations in the high and low grayscale display modes through a same data wire can also be simultaneous realized in embodiments of the present disclosure.

Pixel circuits according to an embodiment of the present disclosure may adopt the current control mode+light emitting period control mode. At the high grayscale or low grayscale, different light emitting elements are respectively driven by corresponding light emitting units to emit light, and the light emitting periods thereof do not affect each other. Light emitting period under the high grayscale reaches the maximum, which is advantageous to low power consumption.

When the pixel circuit in embodiments of the present disclosure is in operation, the display cycle includes a first control stage and a second control stage provided in sequence. In the high grayscale display mode:

in the first control stage, the first light emitting unit 121 stores the potential of the data wire D under the control of the potential of the scan wire S, and outputs the potential of the data wire D to the first node a1, so as to control to conduct the connection between the first power supply line VDD and the second node a2, thereby controlling to conduct the communication between the first power supply line VDD and the first light emitting element 123;

In the second control stage, the potential of the first node a1 is equal to the potential of the data wire D stored in the first light emitting unit 121 in the first control stage. The connection of the first power supply line VDD and the second node a2 is controlled to be conducted, and the communication between the first power supply line VDD and the first light emitting element 123 is controlled to be conducted. In the second control stage, the second light emitting unit 122 controls to conduct the communication between the second node a2 and the second light emitting element 124 in accordance with the potential of the data wire D under the control of the scan wire S.

In operation of the pixel circuit according to an embodiment of the present disclosure, in the high grayscale display mode, in the first control stage, the first light emitting unit 121 directly conducts the connection between the first power supply line VDD and the first light emitting element 123 by the potential on the data wire D. The first light emitting element 123 is driven by the driving module 11 to emit light. In the second control stage, the first light emitting unit 121 conducts the connection between the first power supply line VDD and the first light emitting element 123 by the stored potential of the data wire D. The first light emitting element 123 is driven by the driving module 11 to emit light. In the high grayscale display mode, a high grayscale display effect is realized with a high driving current and a long light emitting period in the embodiment of the present disclosure, so that the power consumption of a backplane can be reduced.

When a pixel circuit in embodiments of the present disclosure is in operation, the display cycle includes a first control stage and a second control stage provided in sequence. In the low grayscale display mode:

in the first control stage and the second control stage, the second node a2 is disconnected with the first light emitting element 123 under the control of the first light emitting unit 121;

in the first control stage, the first light emitting unit 121 stores the potential of the data wire D under the control of the potential of the scan wire S, and outputs the potential of the data wire D to the first node a1, so as to control to conduct the connection between the first power supply line VDD and the second node a2;

in the second control stage, the potential of the first node a1 is equal to the potential of the data wire D stored in the first light emitting unit 121 in the first control stage, and the connection between the first power supply line VDD and the second node a2 is controlled to be conducted. In the second control stage, the second light emitting unit 122 controls to conduct the communication between the second node a2 and the second light emitting element 124 in accordance with the potential of the data wire D under the control of the scan wire S.

The period during which the second light emitting element 124 emits light in the low grayscale display mode is less than the period during which the first light emitting element 123 emits light in the high grayscale display mode. A low grayscale display is realized with a high driving current and a low light emitting period, so that the low grayscale display effect can be realized under the premise of the high driving current.

When the pixel circuits in embodiments of the present disclosure work, the display cycle includes a first control stage, a second control stage, and a third control stage provided in sequence. In the low grayscale display mode:

in the first control stage and the second control stage, the second node a2 is disconnected from the first light emitting element 123 under the control of the first light emitting unit 121;

in the first control stage, the first light emitting unit 121 stores the potential of the data wire D under the control of the potential of the scan wire S, and outputs the potential of the data wire D to the first node a1, so as to control to conduct the connection between the first power supply line VDD and the second node a2;

in the second control stage, the potential of the first node a1 is equal to the potential of the data wire D stored in the first light emitting unit 121 in the first control stage, and the connection between the first power supply line VDD and the second node a2 is controlled to be conducted; in the second control stage, the second light emitting unit 122 controls to conduct the communication between the second node a2 and the second light emitting element 124 in accordance with the potential of the data wire D under the control of the scan wire S; in a second control stage, the second light emitting unit 122 also stores the potential of the data wire D under the control of the scan wire S;

in the third control stage, the second light emitting unit 122 controls to conduct the communication between the second node a2 and the second light emitting element 124 based on the potential stored in the second control stage.

The period during which the second light emitting element 124 emits light in the low grayscale display mode is equal to the period during which the first light emitting element 123 emits light in the high grayscale display mode. In the pixel circuit in embodiments of the present disclosure, the period during which the first light-emitting element 123 emits light is designed to be equal to the period during which the second light-emitting element 124 emits light, so that when one light emitting element emits light abnormally, the other light-emitting element can emit light normally, thereby reducing the dark spot and improving the yield of the backplane.

Figure 2:
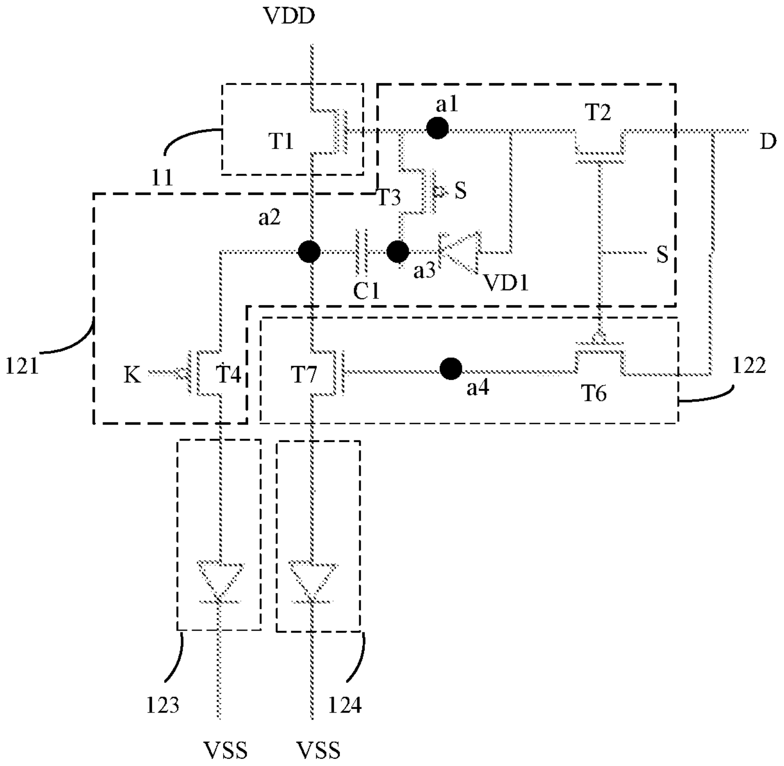
FIG. 2 is a first circuit schematic view of the pixel circuit shown in FIG. 1.

Specifically, referring to FIG. 2, FIG. 2 is a first circuit diagram of the pixel circuit shown in FIG. 1. In combination with FIGS. 1 and 2, the driving module 11 includes a first transistor T1. A first terminal of the first transistor T1 is electrically connected to the first node a1. A second terminal of the first transistor T1 is electrically connected to the first power supply line VDD. A third terminal of the first transistor T1 is electrically connected to the second node a2.

In combination with FIGS. 1 and 2, the first light emitting unit 121 includes a second transistor T2, a third transistor T3, a fourth transistor T4, a first zener diode VD1, and a first capacitor C1.

A first terminal of the second transistor T2 is electrically connected to the scan wire S. A first terminal of the second transistor T2 is electrically connected to the data wire D. A third terminal of the second transistor T2 is electrically connected to the first node a1.

A first terminal of the third transistor T3 is electrically connected to the scan wire S. A first terminal of the third transistor T3 is electrically connected to the first node a1. A third terminal of the third transistor T3 is electrically connected to the third node a3.

A first terminal of the fourth transistor T4 is electrically connected to the control wire K. A second terminal of the fourth transistor T4 is electrically connected to the second node a2. A third terminal of the fourth transistor T4 is electrically connected to an anode terminal of the first light emitting element 123. A cathode terminal of the first light emitting element 123 is electrically connected to the second power supply line VSS.

An anode terminal of the first zener diode VD1 is electrically connected to the first node a1. A cathode terminal of the first zener diode VD1 is electrically connected to the third node a3.

A first terminal of the first capacitor C1 is electrically connected to the third node a3. A second terminal of the first capacitor C1 is electrically connected to the second node a2.

In combination with FIGS. 1 and 2, the second light emitting unit 122 includes a sixth transistor T6 and a seventh transistor T7.

A first terminal of the sixth transistor T6 is electrically connected to the scan wire S. A second terminal of the sixth transistor T6 is electrically connected to the data wire D. A third terminal of the sixth transistor T6 is electrically connected to the fourth node.

A first terminal of the seventh transistor T7 is electrically connected to the fourth node a4. A second terminal of the seventh transistor T7 is electrically connected to the second node a2. A third terminal of the seventh transistor T7 is electrically connected to an anode terminal of the second light emitting element 124. A cathode of the second light emitting element 124 is electrically connected to the second power supply line VSS.

In the pixel circuit shown in FIG. 2, each of the first transistor T1 and the seventh transistor T7 is an N-type transistor, and each of the second transistor T2, the third transistor T3, the fourth transistor T4, and the sixth transistor T6 is a P-type transistor, but not limited thereto.

Figure 3:
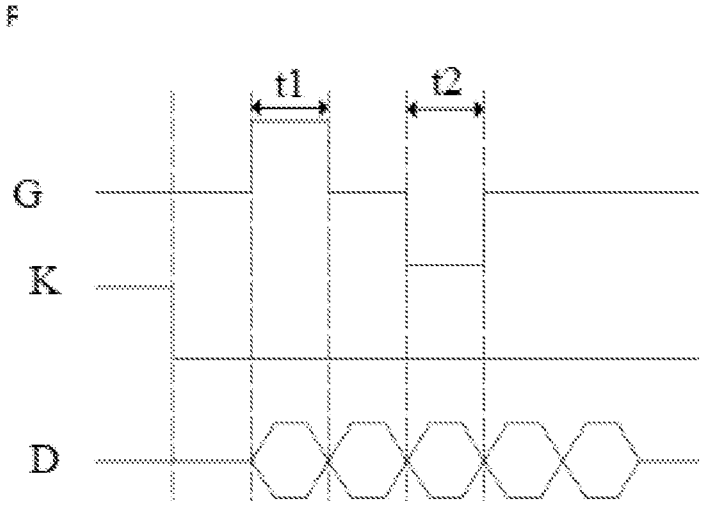
FIG. 3 is a timing diagram of a specific embodiment of the pixel circuit as shown in FIG. 2 of the present disclosure in a high grayscale display mode during operation.

When a specific embodiment of the pixel circuit shown in FIG. 2 is in operation, in the high grayscale display mode, as shown in FIG. 3, the display cycle may include a first control stage t1 and a second control stage t2 provided in sequence.

In the first control stage t1, the first light emitting unit 121 stores the potential of the data wire D under the control of the potential of the scan wire S, and outputs the potential of the data wire D to the first node a1. At this time, the first transistor T1, the second transistor T2, and the fourth transistor T4 are turned on, and the third transistor T3, the sixth transistor T6, and the seventh transistor T7 are turned off. The connection between first power supply line VDD and the second node a2 is controlled to be conducted, so as to control to conduct the communication between the first power supply line VDD and the first light emitting element 123; and in the second control stage t2, the potential of the first node a1 is equal to the potential of the data wire D stored in the first light emitting unit 121 in the first control stage t1; at the time, the first transistor T1, the third transistor T3, the fourth transistor T4, the sixth transistor T6, and the seventh transistor T7 are turned on, and the second transistor T2 is turned off. The connection of the first power supply line VDD and the second node a2 is controlled to be conducted, so as to control to conduct the communication between the first power supply line VDD and the first light emitting element 123; in the second control stage t2, the second light emitting unit 122 controls to conduct the communication between the second node a2 and the second light emitting element 124 in accordance with the potential of the data wire D under the control of the scan wire S.

As shown in FIG. 3, the first light emitting period of the first light emitting element is the period of the first control stage t1 and the period of the second control stage t2. When a specific embodiment of the pixel circuit according to the present disclosure is in operation, the first light emitting element emits light during the first light emitting period which is a long-period. The signal supplied from the data wire D has a value selected from a high current density range, and the grayscale brightness of 50-255 is realized with the high current density and the long light emitting period.

Figure 4:
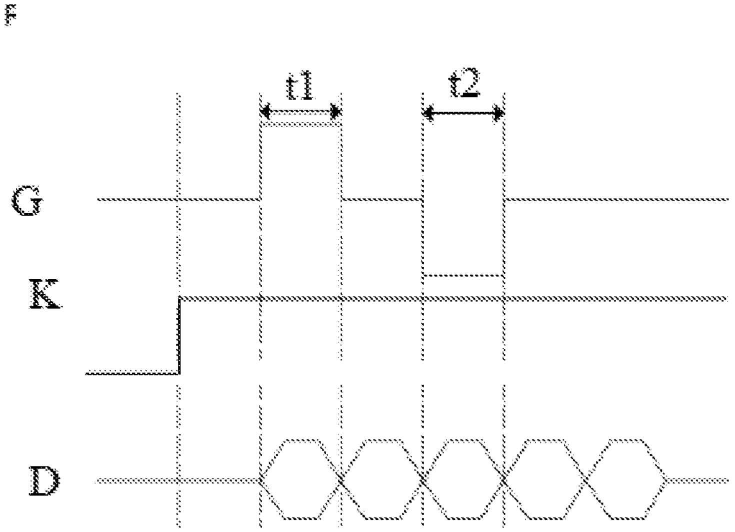
FIG. 4 is a timing diagram of a specific embodiment of the pixel circuit shown in FIG. 2 of the present disclosure in a low grayscale display mode during operation.

In a specific embodiment of the pixel circuit shown in FIG. 2 is in operation, in the low grayscale display mode, as shown in FIG. 4, the display period may include a first control stage t1 and a second control stage t2 provided in sequence.

In the first control stage t1 and the second control stage t2, the fourth transistor T4 is turned off, and the second node a2 is disconnected from the first light emitting element 123 under the control of the first light emitting unit 121.

In the first control stage t1, the first light emitting unit 121 is controlled by the potential of the scan wire S. At this time, the first transistor T1 and the second transistor T2 are turned on, the potential of the data wire D is stored, and the potential of the data wire D is output to the first node a1, so that the connection between the first power supply line VDD and the second node a2 is controlled to be conducted.

In the second control stage t2, the potential of the first node a1 is equal to the potential of the data wire D stored in the first light emitting unit 121 in the first control stage t1. At this time, the first transistor T1, the third transistor T3, the sixth transistor T6, and the seventh transistor T7 are turned on and the second transistor T2 is turned off. The second light emitting unit 122 controls to conduct the communication between the second node a2 and the second light emitting element 124 in accordance with the potential of the data wire D under the control of the scan wire S.

As shown in FIG. 4, the second light emitting period of the second light emitting element is the period of the second control stage t2. When a specific embodiment of the pixel circuit according to the present disclosure is in operation, the second light-emitting element 124 emits light during the second light-emitting period which is a short period, and the signal supplied from the data wire D has a value in a high current density range. Grayscale brightness of 0-50 can be realized with both the high current density and the short light emitting period.

Figure 5:
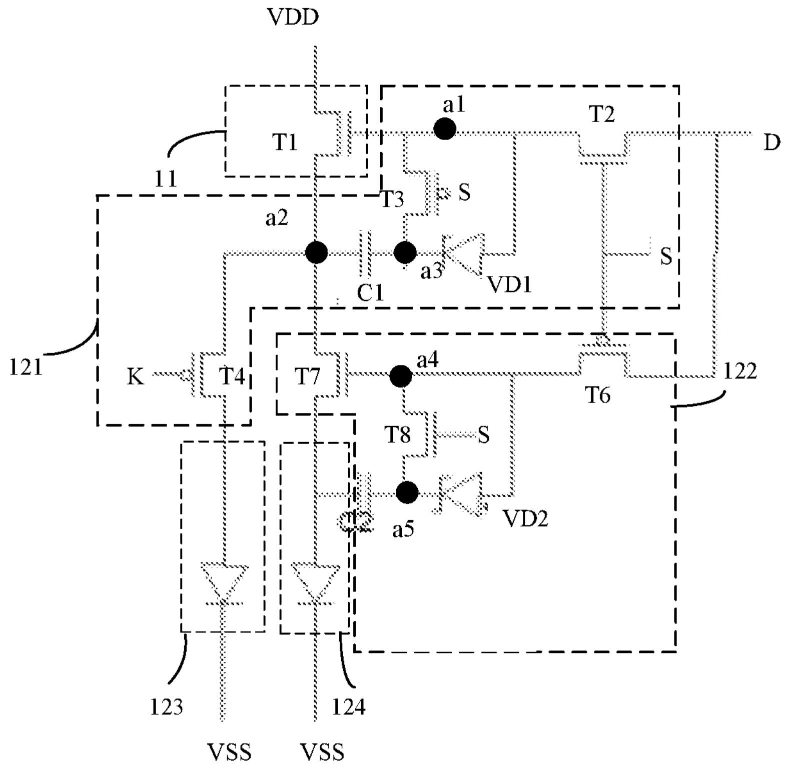
FIG. 5 is a second circuit schematic view of the pixel circuit shown in FIG. 1.

Referring to FIG. 5, FIG. 5 is a second circuit diagram of the pixel circuit shown in FIG. 1. The pixel circuit shown in FIG. 5 differs from the pixel circuit shown in FIG. 2 in that the second light emitting unit 122 in the pixel circuit shown in FIG. 5 further includes an eighth transistor T8, a second zener diode VD2, and a second capacitor C2.

A first terminal of the eighth transistor T8 is electrically connected to the scan wire S. A second terminal of the eighth transistor T8 is electrically connected to the fourth node a4. A third terminal of the eighth transistor T8 is electrically connected to the fifth node a5.

An anode terminal of the second zener diode VD2 is electrically connected to the fourth node a4. A cathode terminal of the second zener diode VD2 is electrically connected to the fifth node a5.

A first terminal of the second capacitor C2 is electrically connected to the fifth node a5. A second terminal of the second capacitor C2 is electrically connected to the anode terminal of the second light emitting element 124. The cathode terminal of the second light emitting element 124 is electrically connected to the second power supply line VSS.

Figure 6:
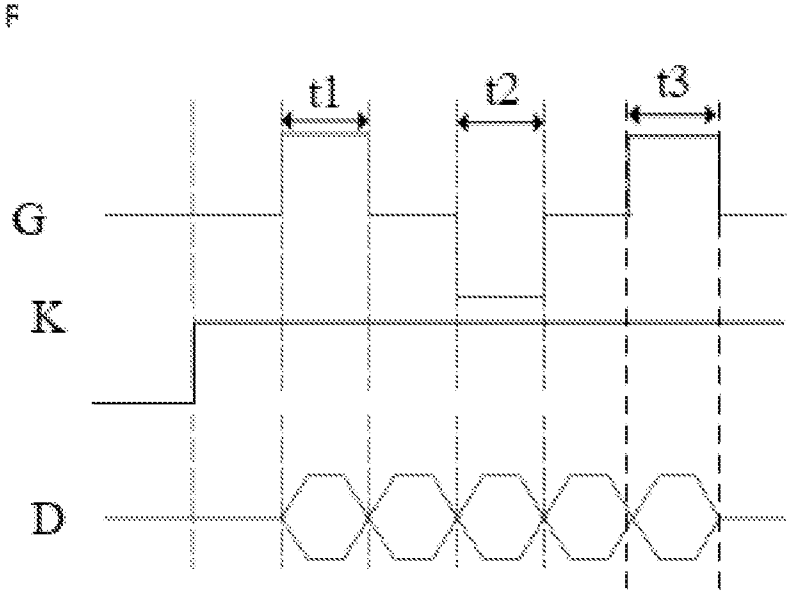
FIG. 6 is a timing diagram of a specific embodiment of the pixel circuit shown in FIG. 5 of the present disclosure in a low grayscale display mode during operation.

When a specific embodiment of the pixel circuit shown in FIG. 5 is in operation, in the low grayscale display mode, as shown in FIG. 6, the display period may include a first control stage t1, a second control stage t2, and a third control stage t3 provided in sequence.

In the first control stage t1 and the second control stage t2, the fourth transistor T4 is turned off, and the second node a2 is disconnected with the first light emitting element 123 under the control of the first light emitting unit 121.

In the first control stage t1, the first light emitting unit 121 is controlled by the potential of the scan wire S. At this time, the first transistor T1 and the second transistor T2 are turned on, the potential of the data wire D is stored, and the potential of the data wire D is output to the first node a1, so that the connection between the first power supply line VDD and the second node a2 is controlled to be conducted.

In the second control stage t2, the potential of the first node a1 is equal to the potential of the data wire D stored in the first light emitting unit 121 in the first control stage t1. At this time, the first transistor T1, the third transistor T3, the sixth transistor T6, and the seventh transistor T7 are turned on and the second transistor T2 is turned off. The second light emitting unit 122 controls to conduct the communication between the second node a2 and the second light emitting element 124 in accordance with the potential of the data wire D under the control of the scan wire S. At the second control stage t2, the eighth transistor T8 is turned on, and the second light emitting unit 122 also stores the potential of the data wire D under the control of the scan wire S.

In the third control stage t3, the second light emitting unit 122 controls to conduct communication between the second node a2 and the second light emitting element 124 based on the potential stored in the second control stage t2.

As shown in FIG. 6, the third light emitting period of the second light emitting element is the period of the second control stage t2 and the period of the third control stage t3. When a specific embodiment of the pixel circuit in FIG. 5 according to the present disclosure is in operation, the second light-emitting element 124 emits light, and a used time is a third light-emitting period. The first light-emitting period and the third light-emitting period are provided to have the same duration. In the pixel circuit according to an embodiment of the present disclosure, the light-emitting period of the first light-emitting element 123 is provided to be equal to the light-emitting period of the second light-emitting element 124, so that when one light-emitting element emits light abnormally, the other light-emitting element can emit light normally, thereby reducing the dark spot and improving the backplane yield.

Figure 7:
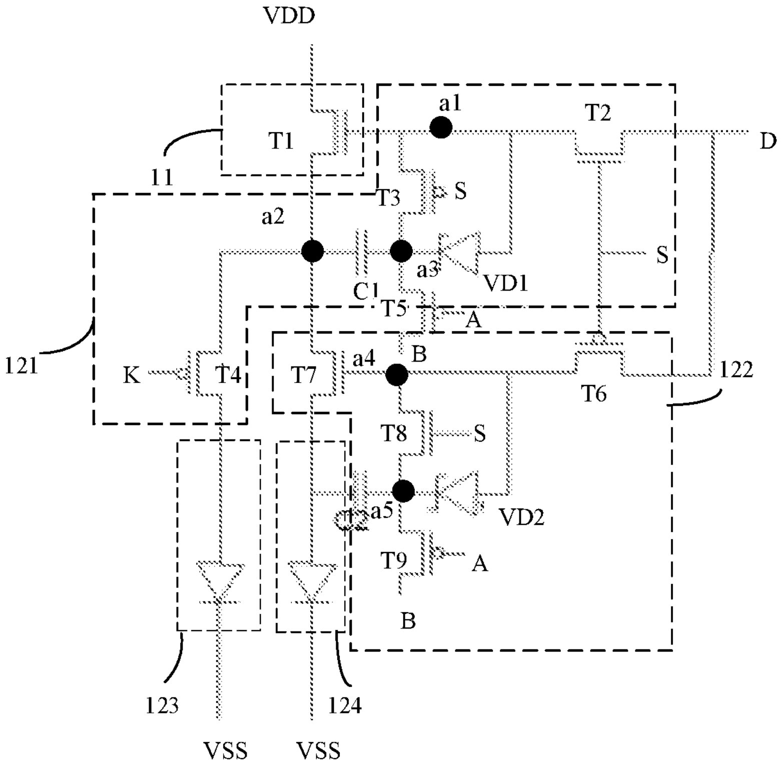
FIG. 7 is a third circuit schematic view of the pixel circuit shown in FIG. 1.

Referring to FIG. 7, FIG. 7 is a schematic diagram of a third circuit of the pixel circuit shown in FIG. 2. The pixel circuit shown in FIG. 7 differs from the pixel circuit shown in FIG. 5 in that the first light emitting unit in the pixel circuit shown in FIG. 7 further includes a fifth transistor T5, and the second light emitting unit further includes a ninth transistor T9.

A first terminal of the fifth transistor T5 is electrically connected to a reset control wire A, a second terminal of the fifth transistor T5 is electrically connected to a reset wire B, and a third terminal of the fifth transistor T5 is electrically connected to the third node a3.

A first terminal of the ninth transistor T9 is electrically connected to the reset control wire A, a second terminal of the ninth transistor T9 is electrically connected to the reset wire B, and a third terminal of the ninth transistor T9 is electrically connected to the fifth node a5.

In an embodiment of the present disclosure, by providing the fifth transistor T5 and the ninth transistor T9, the reset of the pixel circuit may be controlled.

The pixel driving method according to embodiments of the present disclosure is applied to the pixel circuit described above, and the pixel driving method includes:

- the driving module controls to conduct or disconnect the communication between the first power supply line and the second node under the control of the potential of the first node;
- the first light emitting unit controls the potential of the first node in accordance with the potential of the data wire under the control of the potential of the scan wire, to control to conduct or disconnect the communication between the first power supply line and the first light emitting element;
- the second light emitting unit controls to conduct or disconnect the communication between the second node and the second light emitting unit in accordance with the potential of the data wire under the control of the potential of the scan wire.

According to the pixel driving method of embodiments of the present disclosure, the high and low grayscale voltages can be driven respectively by means of the current control and the period control in the pixel driving method. Both a long-period driving in a high grayscale display mode and a high-current driving in a low grayscale display mode are obtained. In addition, operations in the high and low grayscale display modes through a same data wire can also be simultaneous realized in embodiments of the present disclosure.

In the pixel driving method of embodiments of the present disclosure, the display cycle includes a first control stage and a second control stage provided in sequence;

- the pixel driving method includes in a high grayscale display mode:
- in the first control stage, a first light emitting unit stores a potential of a data wire under the control of a potential of a scan wire, outputs the potential of the data wire to a first node, and controls to conduct the connection between the first power supply line and the second node, thereby controlling to conduct the communication between the first power supply line and the first light emitting element; and
- in the second control stage, the potential of the first node is equal to the potential of the data wire stored in the first light emitting unit in the first control stage; the connection between the first power supply line and a second node are controlled to be conducted, and the communication between the first power supply line and the first light emitting element is controlled to be conducted; in the second control stage, the second light emitting unit controls to conduct the communication between the second node and the second light emitting element in accordance with the potential of the data wire under the control of the scan wire.

The pixel driving method further includes in a low grayscale display mode:

- in a first control stage and a second control stage, the second node is disconnected with the first light emitting element under the control of the first light emitting unit;
- in a first control stage, the first light emitting unit stores the potential of the data wire under the control of the potential of the scan wire, outputs the potential of the data wire to the first node, and controls to conduct the connection between the first power supply line and the second node;
- in a second control stage, the potential of the first node is equal to the potential of the data wire stored in the first light emitting unit in the first control stage, and the connection between the first power supply line and the second node are controlled to be conducted. In the second control stage, the second light emitting unit controls to conduct the communication between the second node and the second light emitting element in accordance with the potential of the data wire under the control of the scan wire.

In the pixel driving method of embodiments of the present disclosure, the display cycle further includes providing a third control stage after the second control stage;

- in a second control stage, the second light emitting unit also stores the potential of the data wire under the control of the scan wire; and
- in the third control stage, the second light emitting unit is controlled to conduct the communication between the second node and the second light emitting element based on the potential stored in the second control stage.

The display device according to embodiments of the present disclosure includes the pixel circuit described above.

The display device provided in embodiments of the present disclosure may be any product or component having a display function, such as a mobile phone, a tablet computer, a television, a display, a notebook computer, a digital photo frame, or a navigator.

The above are some of preferred embodiments of the present disclosure, and it should be noted that for those of ordinary skill in the art, several modifications and finishes may be made without departing from the principles of the present disclosure, which shall also be considered to be within the protection scope of the present invention.

What is claimed is:

1. A pixel circuit comprising a driving module and a light emitting module, wherein,

- the driving module is electrically connected to a first power supply line, a first node, and a second node, respectively, and the driving module is configured to control to conduct or disconnect the communication between the first power supply line and the second node under the control of a potential of the first node; and
- the light emitting module comprises a first light emitting unit, a first light emitting element, a second light emitting unit, and a second light emitting element; and wherein the first light emitting unit is electrically connected to a data wire, a scan wire, the first node, the second node, and the first light emitting element, respectively, and the first light emitting unit is configured to control the potential of the first node according to a potential of the data wire under the control of a potential of the scan wire to control, to conduct or disconnect the communication between the first power supply line and the first light emitting element;

the second light emitting unit is electrically connected to the data wire, the scan wire, the second node, and the second light emitting element, respectively, and the second light emitting unit is configured to control to conduct or disconnect the communication between the second node and the second light emitting element in accordance with the potential of the data wire under the control of the potential of the scan wire, and the driving module comprises a first transistor, a gate of the first transistor is electrically connected to the first node, one of a source and a drain of the first transistor is electrically connected to the first power supply line, and another of the source and the drain of the first transistor is electrically connected to the second node.

2. The pixel circuit according to claim 1, wherein the first light emitting unit comprises a second transistor, a third transistor, a fourth transistor, a first zener diode, and a first capacitor;

wherein a first terminal of the second transistor is electrically connected to the scan wire, a first terminal of the second transistor is electrically connected to the data wire, and a third terminal of the second transistor is electrically connected to the first node;

a first terminal of the third transistor is electrically connected to the scan wire, a first terminal of the third transistor is electrically connected to the first node, and a third terminal of the third transistor is electrically connected to a third node;

a first terminal of the fourth transistor is electrically connected to a control wire, a second terminal of the fourth transistor is electrically connected to the second node, and a third terminal of the fourth transistor is electrically connected to an anode terminal of the first light emitting element; and a cathode terminal of the first light emitting element is electrically connected to a second power supply line;

an anode terminal of the first zener diode is electrically connected to the first node, and a cathode terminal of the first zener diode is electrically connected to the third node; and a first terminal of the first capacitor is electrically connected to the third node, and a second terminal of the first capacitor is electrically connected to the second node.

3. The pixel circuit according to claim 2, wherein the first light emitting unit further comprises a fifth transistor, wherein a first terminal of the fifth transistor is electrically connected to a reset control wire, a second terminal of the fifth transistor is electrically connected to a reset wire, and a third terminal of the fifth transistor is electrically connected to the third node.

4. The pixel circuit according to claim 1, wherein the second light emitting unit comprises a sixth transistor and a seventh transistor;

wherein a first terminal of the sixth transistor is electrically connected to the scan wire, a second terminal of the sixth transistor is electrically connected to the data wire, and a third terminal of the sixth transistor is electrically connected to a fourth node;

a first terminal of the seventh transistor is electrically connected to the fourth node, a second terminal of the seventh transistor is electrically connected to the second node, and a third terminal of the seventh transistor is electrically connected to an anode terminal of the second light emitting element; and a cathode terminal of the second light emitting element is electrically connected to a second power supply line.

5. The pixel circuit according to claim 4, wherein the second light emitting unit further comprises an eighth transistor, a second zener diode, and a second capacitor;

wherein a first terminal of the eighth transistor is electrically connected to the scan wire, a second terminal of the eighth transistor is electrically connected to the fourth node, and a third terminal of the eighth transistor is electrically connected to a fifth node;

an anode terminal of the second zener diode is electrically connected to the fourth node, and a cathode terminal of the second zener diode is electrically connected to the fifth node;

a first terminal of the second capacitor is electrically connected to the fifth node, a second terminal of the second capacitor is electrically connected to the anode terminal of the second light emitting element; and a cathode terminal of the second light emitting element is electrically connected to the second power source.

6. The pixel circuit according to claim 5, wherein the second light emitting unit further comprises a ninth transistor, wherein a first terminal of the ninth transistor is electrically connected to a reset control wire, a second terminal of the ninth transistor is electrically connected to a reset wire, and a third terminal of the ninth transistor is electrically connected to the fifth node.

7. The pixel circuit according to claim 1, wherein the first light emitting element is a Micro-light emitting diode or a Mini-light emitting diode, and the second light emitting element is a Micro-light emitting diode or a Mini-light emitting diode.

8. A pixel driving method applied to a pixel circuit, wherein the pixel circuit comprises a driving module and a light emitting module;

wherein the driving module is electrically connected to a first power supply line, a first node, and a second node, respectively, and the driving module is configured to control to conduct or disconnect the communication between the first power supply line and the second node under the control of a potential of the first node;

the light emitting module comprises a first light emitting unit, a first light emitting element, a second light emitting element, and a second light emitting element; and wherein the first light emitting unit is electrically connected to a data wire, a scan wire, the first node, the second node, and the first light emitting element, respectively, and the first light emitting unit is configured to control the potential of the first node according to a potential of the data wire under the control of a potential of the scan wire to control, to conduct or disconnect the communication between the first power supply line and the first light emitting element; and the second light emitting unit is electrically connected to the data wire, the scan wire, the second node, and the second light emitting element, respectively, and the second light emitting unit is configured to control to conduct or disconnect the communication between the second node and the second light emitting element in accordance with the potential of the data wire under the control of the potential of the scan wire;

wherein the pixel driving method comprises:

controlling the driving module to connection or disconnect the communication between the first power supply line and the second node under the control of the potential of the first node;

controlling the first light emitting unit to connection or disconnect the communication between the first power supply line and the first light emitting element in accordance with the potential of the data wire under the control of the potential of the scan wire; and controlling the second light emitting unit to connection or disconnect the communication between the second node and the second light emitting unit in accordance with the potential of the data wire under the control of the potential of the scan wire, and wherein the driving module comprises a first transistor, a gate of the first transistor is electrically connected to the first node, one of a source and a drain of the first transistor is electrically connected to the first power supply line, and another of the source and the drain of the first transistor is electrically connected to the second node.

9. The pixel driving method according to claim 8, wherein the display cycle comprises a first control stage and a second control stage provided in sequence;

wherein the pixel driving method comprises in a high grayscale display mode:

in the first control stage, the first light emitting unit stores the potential of the data wire under the control of the potential of the scan wire, outputs the potential of the data wire to the first node, and controls to conduct the connection between the first power supply line and the second node, thereby controlling to conduct the communication between the first power supply line and the first light emitting element;

in the second control stage, the potential of the first node is equal to the potential of the data wire stored in the first light emitting unit in the first control stage, the connection between the first power supply line and the second node is controlled to be conducted, and the communication between the first power supply line and the first light emitting element is controlled to be conducted; in the second control stage, the second light emitting unit controls to conduct the communication between the second node and the second light emitting element in accordance with the potential of the data wire under the control of the scan wire;

wherein the pixel driving method further comprises in a low grayscale display mode:

in the first control stage and the second control stage, the second node is disconnected from the first light emitting element under the control of the first light emitting unit;

in the first control stage, the first light emitting unit stores the potential of the data wire under the control of the potential of the scan wire, outputs the potential of the data wire to the first node, and controls to conduct the connection between the first power supply line and the second node; and in the second control stage, the potential of the first node is equal to the potential of the data wire stored in the first light emitting unit in the first control stage, and a connection between the first power supply line and the second node is controlled to be conducted; in the second control stage, the second light emitting unit controls to conduct the communication between the second node and the second light emitting element in accordance with the potential of the data wire under the control of the scan wire.

10. The pixel driving method according to claim 9, wherein the display cycle further comprises a third control stage provided after the second control stage;

wherein in the second control stage, the second light emitting unit further stores the potential of the data wire under the control of the scan wire; and in the third control stage, the second light emitting unit controls to conduct the communication between the second node and the second light emitting element based on the potential stored in the second control stage.

11. The pixel driving method according to claim 9, wherein a period during which the second light emitting element emits light in the low grayscale display mode is less than a period during which the first light emitting element emits light in the high grayscale display mode.

12. A display device comprising a pixel circuit, wherein the pixel circuit comprises a driving module and a light emitting module; wherein, the driving module is electrically connected to a first power supply line, a first node, and a second node, respectively, and the driving module is configured to control to conduct or disconnect the communication between the first power supply line and the second node under the control of a potential of the first node;

the light emitting module comprises a first light emitting unit, a first light emitting element, a second light emitting element, and a second light emitting element; and wherein the first light emitting unit is electrically connected to a data wire, a scan wire, the first node, the second node, and the first light emitting element, respectively, and the first light emitting unit is configured to control the potential of the first node according to a potential of the data wire under the control of a potential of the scan wire to control, to conduct or disconnect the communication between the first power supply line and the first light emitting element;

the second light emitting unit is electrically connected to the data wire, the scan wire, the second node, and the second light emitting element, respectively, and the second light emitting unit is configured to control to conduct or disconnect the communication between the second node and the second light emitting element in accordance with the potential of the data wire under the control of the potential of the scan wire, and the driving module comprises a first transistor, a gate of the first transistor is electrically connected to the first node, one of a source and a drain of the first transistor is electrically connected to the first power supply line, and another of the source and the drain of the first transistor is electrically connected to the second node.

13. The display device according to claim 12, wherein the first light emitting unit comprises a second transistor, a third transistor, a fourth transistor, a first zener diode, and a first capacitor;

wherein a first terminal of the second transistor is electrically connected to the scan wire, a first terminal of the second transistor is electrically connected to the data wire, and a third terminal of the second transistor is electrically connected to the first node;

a first terminal of the third transistor is electrically connected to the scan wire, a first terminal of the third transistor is electrically connected to the first node, and a third terminal of the third transistor is electrically connected to a third node;

a first terminal of the fourth transistor is electrically connected to a control wire, a second terminal of the fourth transistor is electrically connected to the second node, and a third terminal of the fourth transistor is electrically connected to an anode terminal of the first light emitting element;

a cathode terminal of the first light emitting element is electrically connected to a second power supply line;

an anode terminal of the first zener diode is electrically connected to the first node, and a cathode terminal of the first zener diode is electrically connected to the third node; and a first terminal of the first capacitor is electrically connected to the third node, and a second terminal of the first capacitor is electrically connected to the second node.

14. The display device according to claim 13, wherein the first light emitting unit further comprises a fifth transistor, wherein a first terminal of the fifth transistor is electrically connected to a reset control wire, a second terminal of the fifth transistor is electrically connected to a reset wire, and a third terminal of the fifth transistor is electrically connected to the third node.

15. The display device according to claim 12, wherein the second light emitting unit comprises a sixth transistor and a seventh transistor;

wherein a first terminal of the sixth transistor is electrically connected to the scan wire, a second terminal of the sixth transistor is electrically connected to the data wire, and a third terminal of the sixth transistor is electrically connected to a fourth node;

a first terminal of the seventh transistor is electrically connected to the fourth node, a second terminal of the seventh transistor is electrically connected to the second node, and a third terminal of the seventh transistor is electrically connected to an anode terminal of the second light emitting element; and a cathode terminal of the second light emitting element is electrically connected to a second power supply wire.

16. The display device according to claim 15, wherein the second light emitting unit further comprises an eighth transistor, a second zener diode, and a second capacitor;

wherein a first terminal of the eighth transistor is electrically connected to the scan wire, a second terminal of the eighth transistor is electrically connected to the fourth node, and a third terminal of the eighth transistor is electrically connected to a fifth node;

an anode terminal of the second zener diode is electrically connected to the fourth node, and a cathode terminal of the second zener diode is electrically connected to the fifth node; and a first terminal of the second capacitor is electrically connected to the fifth node, and a second terminal of the second capacitor is electrically connected to the anode terminal of the second light emitting element; and a cathode terminal of the second light emitting element is electrically connected to the second power source.

17. The display device according to claim 16, wherein the second light emitting unit further comprises a ninth transistor, wherein a first terminal of the ninth transistor is electrically connected to a reset control wire, a second terminal of the ninth transistor is electrically connected to a reset wire, and a third terminal of the ninth transistor is electrically connected to the fifth node.

18. The display device according to claim 12, wherein the first light emitting element is a Micro-light emitting diode or a Mini-light emitting diode, and the second light emitting element is a Micro-light emitting diode or a Mini-light emitting diode.

* * * * *